(12) United States Patent
Cazes et al.

(10) Patent No.: US 10,994,783 B2
(45) Date of Patent: May 4, 2021

(54) METAL PART WITH CONTROLLED DEFORMATION ORIENTATION

(71) Applicants: AUTOTECH ENGINEERING S.L., Amorebieta-Etxano (ES); HONDA MOTOR CO., LTD., Tokyo (JP)

(72) Inventors: Christophe Cazes, Versailles (FR); Gregory Gatard, Leuville-sur-Orge (FR); Martin Jonsson, Lulea (SE); Atsushi Hasegawa, Tokyo (JP); Yusuke Miura, Tokyo (JP)

(73) Assignees: AUTOTECH ENGINEERING S.L., Amorebieta-Etxano (ES); HONDA MOTOR CO., LTD., Tokyo (JP)

( * ) Notice: Subject to any disclaimer, the term of this patent is extended or adjusted under 35 U.S.C. 154(b) by 302 days.

(21) Appl. No.: 15/880,464

(22) Filed: Jan. 25, 2018

(65) Prior Publication Data
US 2018/0170435 A1 Jun. 21, 2018

Related U.S. Application Data

(63) Continuation of application No. 14/901,967, filed as application No. PCT/EP2014/064384 on Jul. 4, 2014, now Pat. No. 9,908,559.

(30) Foreign Application Priority Data

Jul. 5, 2013 (FR) .................................. 1356633
Jul. 5, 2013 (FR) .................................. 1356634

(51) Int. Cl.
*B62D 21/15* (2006.01)
*B21D 22/20* (2006.01)
(Continued)

(52) U.S. Cl.
CPC ............ *B62D 21/15* (2013.01); *B21D 22/022* (2013.01); *B21D 22/208* (2013.01);
(Continued)

(58) Field of Classification Search
CPC ....................................................... B62D 21/15
See application file for complete search history.

(56) References Cited

U.S. PATENT DOCUMENTS

| 8,691,032 B2 | 4/2014 | Thomas et al. |
| 2007/0052258 A1 | 3/2007 | Baccouche et al. |
| 2009/0072586 A1 | 3/2009 | Peyman et al. |

FOREIGN PATENT DOCUMENTS

| DE | 10257262 A1 | 6/2004 |
| DE | 102006048429 A1 | 4/2008 |

(Continued)

OTHER PUBLICATIONS

Matteson et al., ASM Handbook vol. 06A—Welding Fundamentals and Processes, Resistance Seam Welding, pp. 438-447, 2011 (13 pages) (Year: 2011).*

(Continued)

*Primary Examiner* — Adam Krupicka
(74) *Attorney, Agent, or Firm* — Squire Patton Boggs (US) LLP

(57) ABSTRACT

A metal piece having at least two areas of lower mechanical strength than the body of the piece, said pieces being respectively arranged on one side and the other of a longitudinal central section (PM) of said piece and alternatively located in two locations separated longitudinally along the piece, the areas of lower mechanical strength than the body of the piece being formed by local control of the stamping temperature during a stamping process of the piece, notably a process comprising steps including heating the piece to a temperature range suitable for obtaining an austenitic stage, (Continued)

Figure 2A:
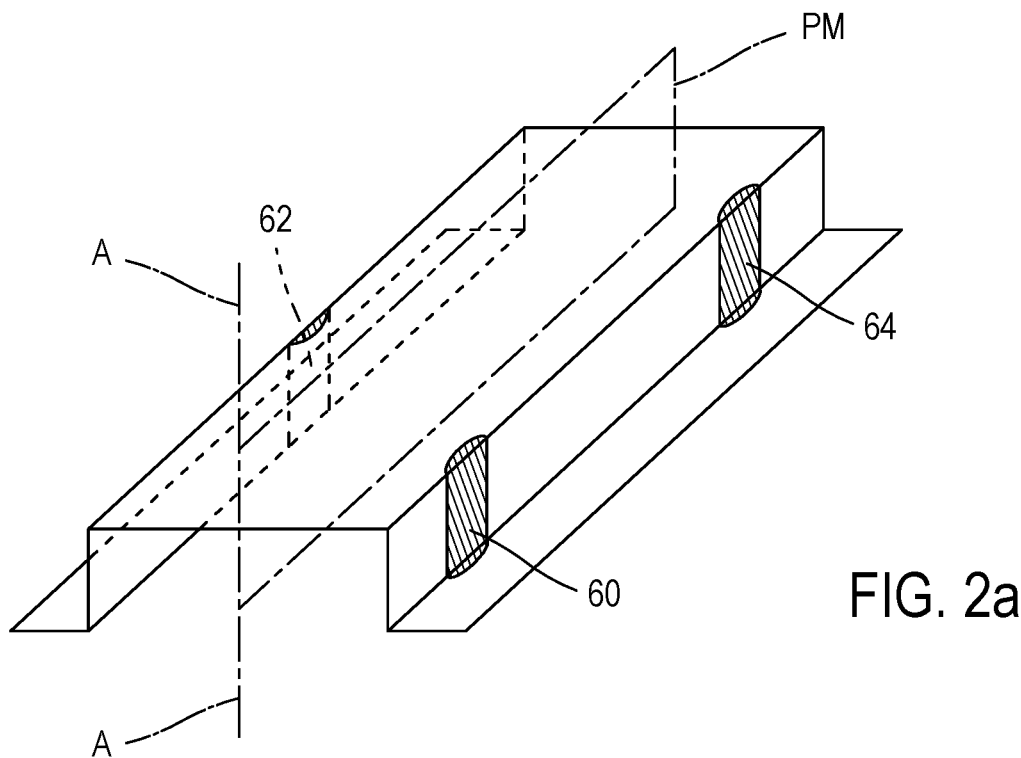

then stamping this piece in a stamping tool suitable for defining different temperatures in the different areas of the stamped piece, for example by virtue of the voids formed in the stamping tool or by local reheating of the stamping tool.

19 Claims, 12 Drawing Sheets

(51) Int. Cl.
    *C21D 9/00*     (2006.01)
    *B21D 35/00*     (2006.01)
    *B62D 29/00*     (2006.01)
    *B21D 22/02*     (2006.01)
    *B21D 47/00*     (2006.01)
    *B21D 53/88*     (2006.01)
    *C21D 11/00*     (2006.01)
    *C21D 1/673*     (2006.01)

(52) U.S. Cl.
    CPC ........... *B21D 35/005* (2013.01); *B21D 47/00* (2013.01); *B21D 53/88* (2013.01); *B62D 21/152* (2013.01); *B62D 29/007* (2013.01); *C21D 9/0068* (2013.01); *C21D 11/00* (2013.01); *C21D 1/673* (2013.01); *C21D 2221/00* (2013.01)

(56) References Cited

FOREIGN PATENT DOCUMENTS

| | | | |
|---|---|---|---|
| EP | 2143621 | A1 | 1/2010 |
| EP | 2565489 | A1 | 3/2013 |
| GB | 2344794 | A | 6/2000 |
| JP | H07119892 | A | 5/1995 |
| JP | 2011/173166 | A | 9/2011 |
| KR | 10-2009-0130099 | A | 12/2009 |
| KR | 10-2010-0096832 | A | 9/2010 |
| KR | 10-2011-0062428 | A | 6/2011 |
| WO | WO 00/03909 | A1 | 1/2000 |
| WO | WO 2006/038868 | A1 | 4/2006 |
| WO | WO 2009/123538 | A1 | 10/2009 |

OTHER PUBLICATIONS

International Search Report dated Oct. 8, 2014 for PCT/EP2014/064384, 7 pages (with English translation).
Written Opinion of the International Searching Authority dated Oct. 8, 2014 for PCT/EP2014/064384, 5 pages.
International Preliminary Report dated Dec. 2, 2015 for PCT/EP2014/064384, 20 pages (with English translation).
Notice of Office Action for Korean Patent Application No. 10-2016-7001492, English Translation provided, 23 pages, Office Action dated Apr. 25, 2020.

* cited by examiner

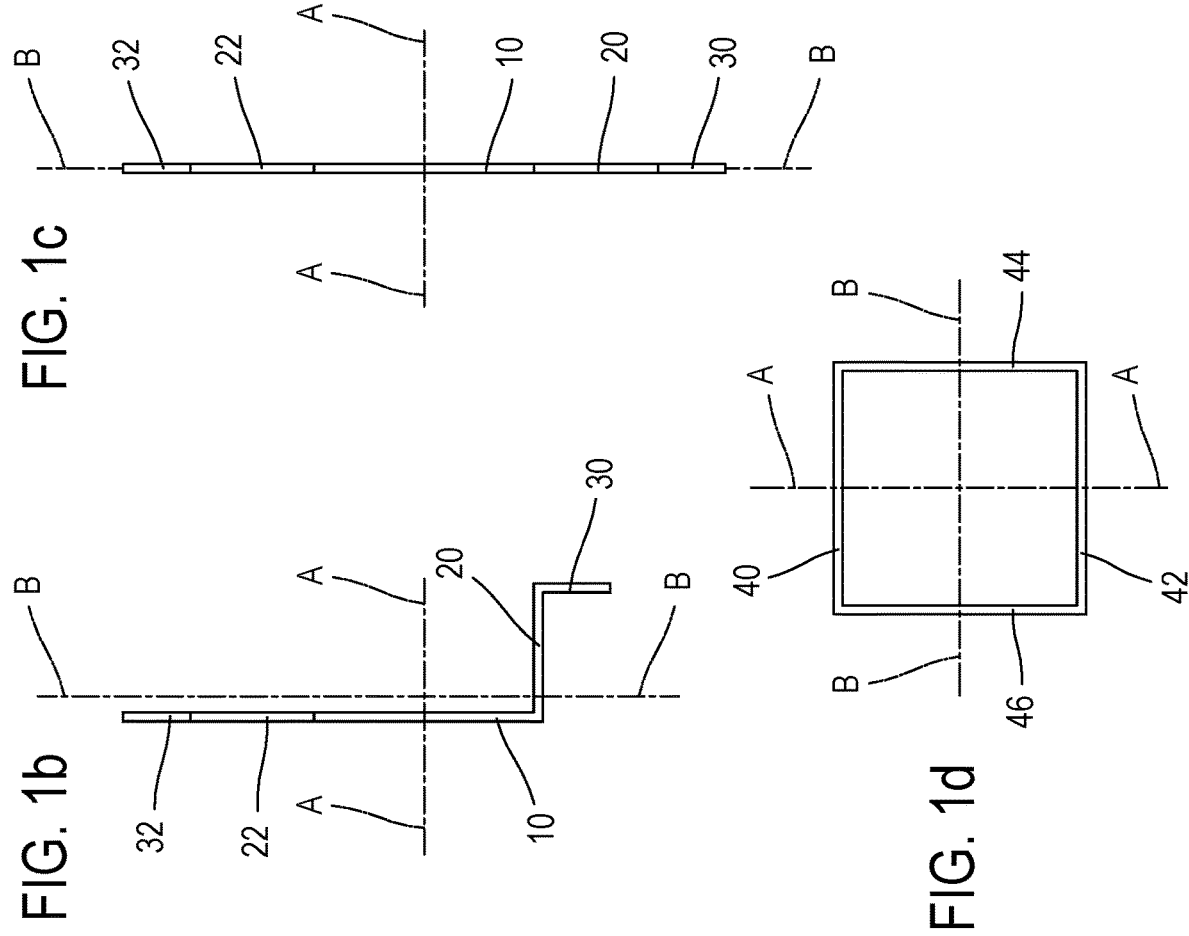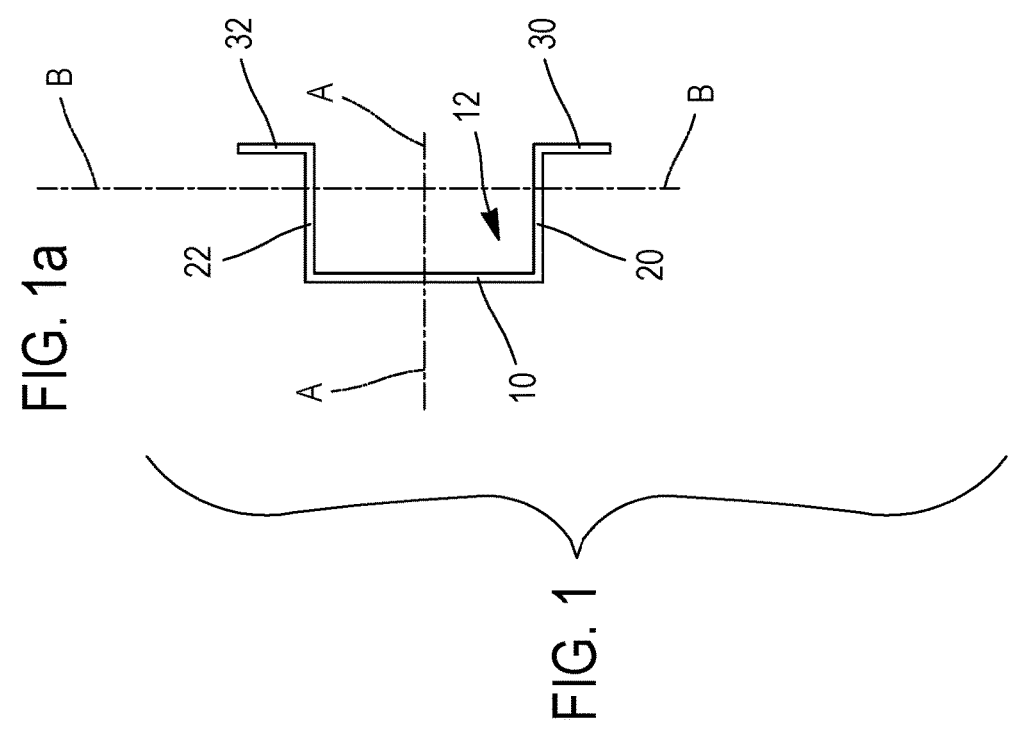

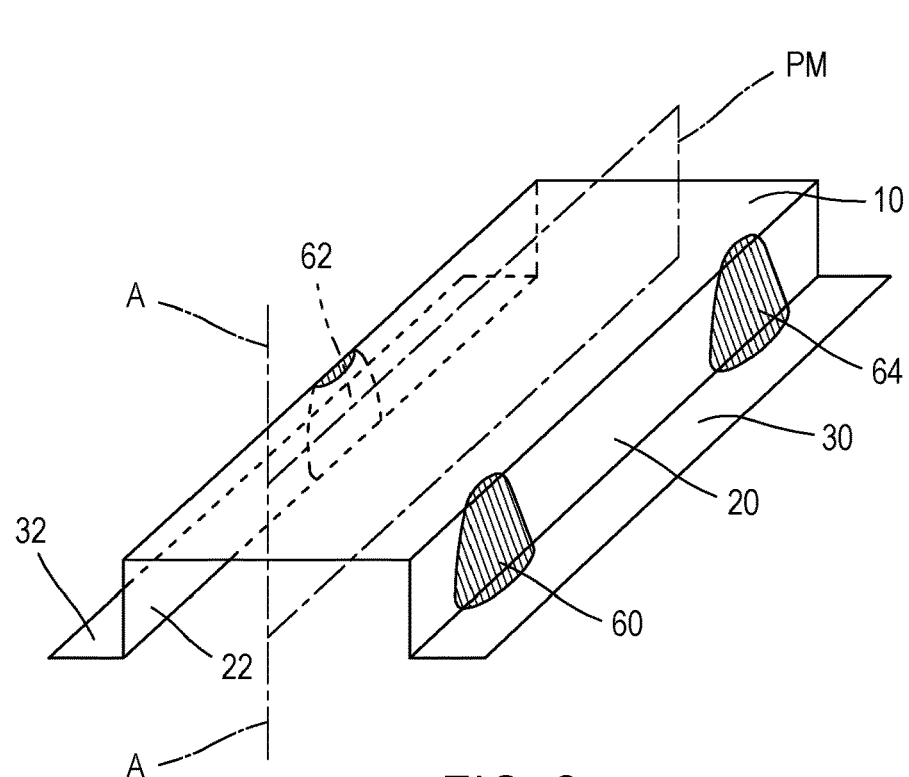
FIG. 2c
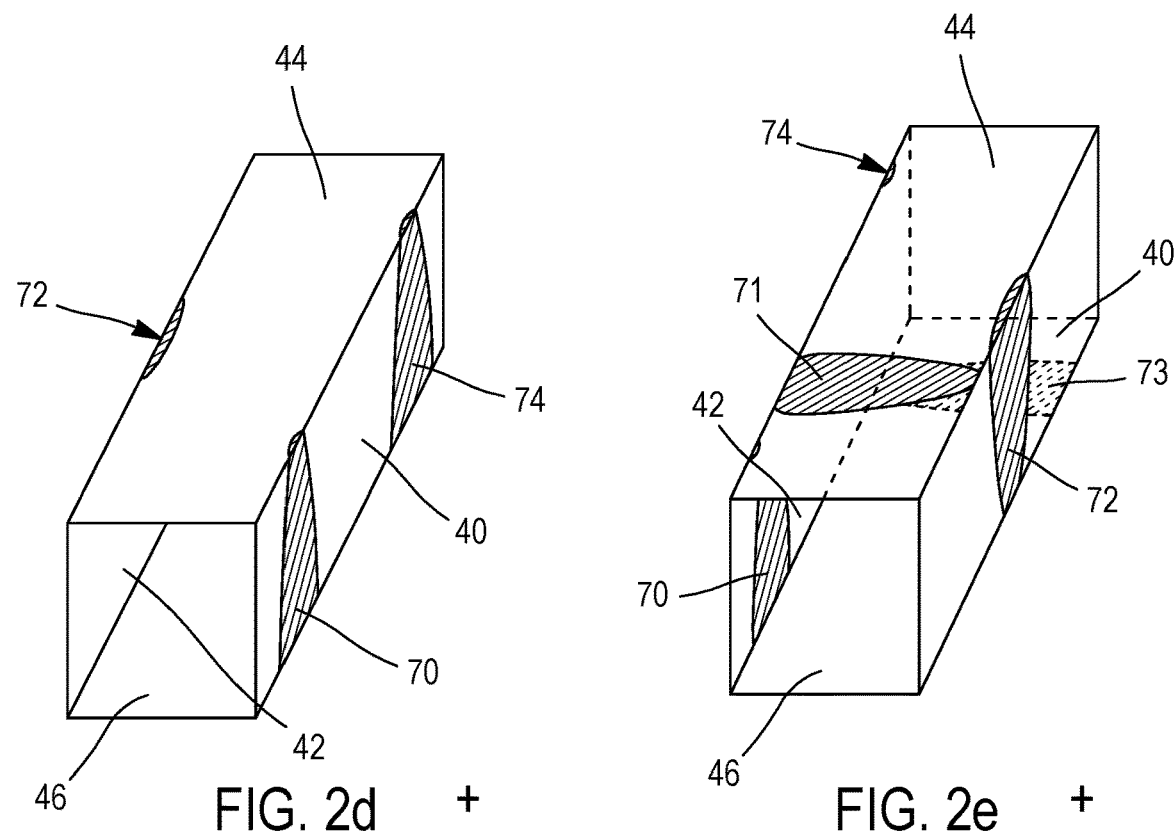
FIG. 2d
FIG. 2e

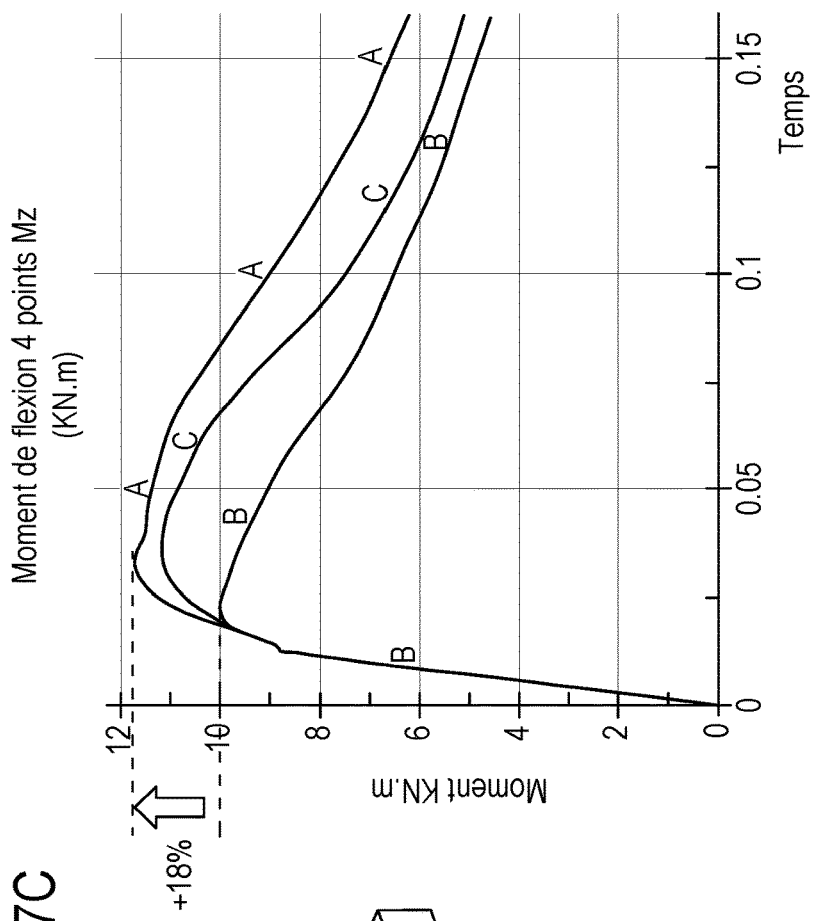
FIG. 5
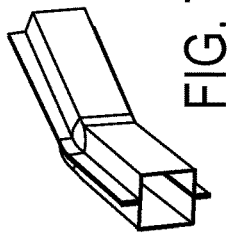
FIG. 7B
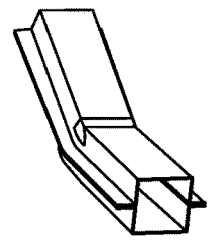
FIG. 6B
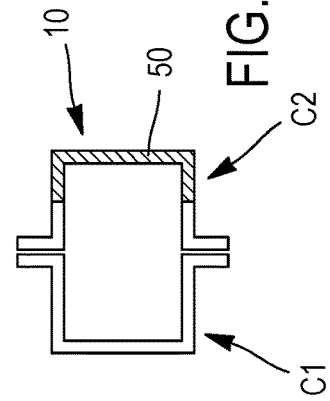
FIG. 7C
FIG. 6C
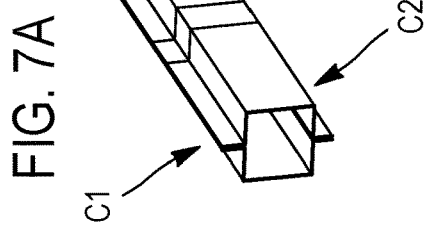
FIG. 7A
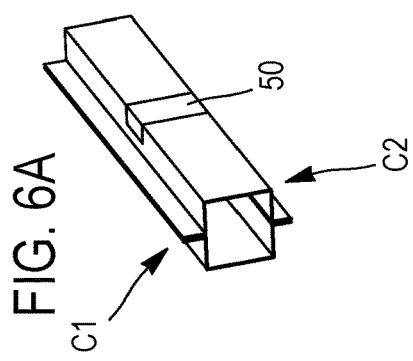
FIG. 6A

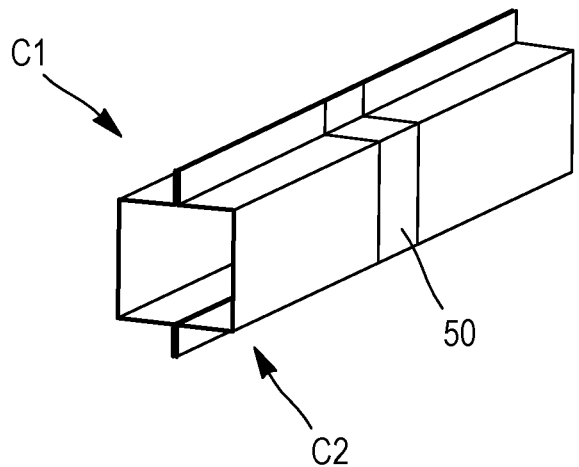
FIG. 6A bis
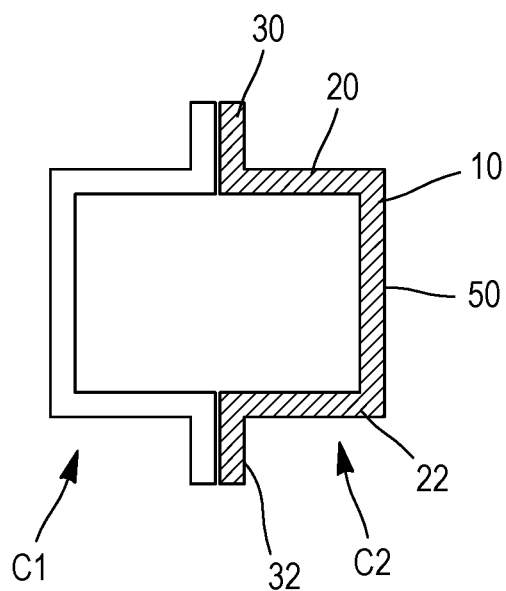
FIG. 6B bis
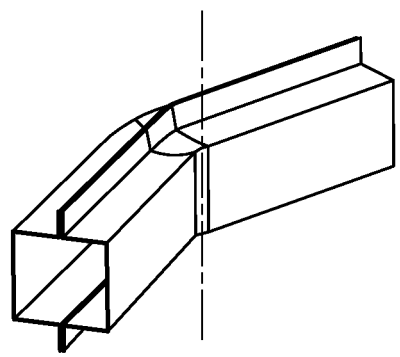
FIG. 6C bis

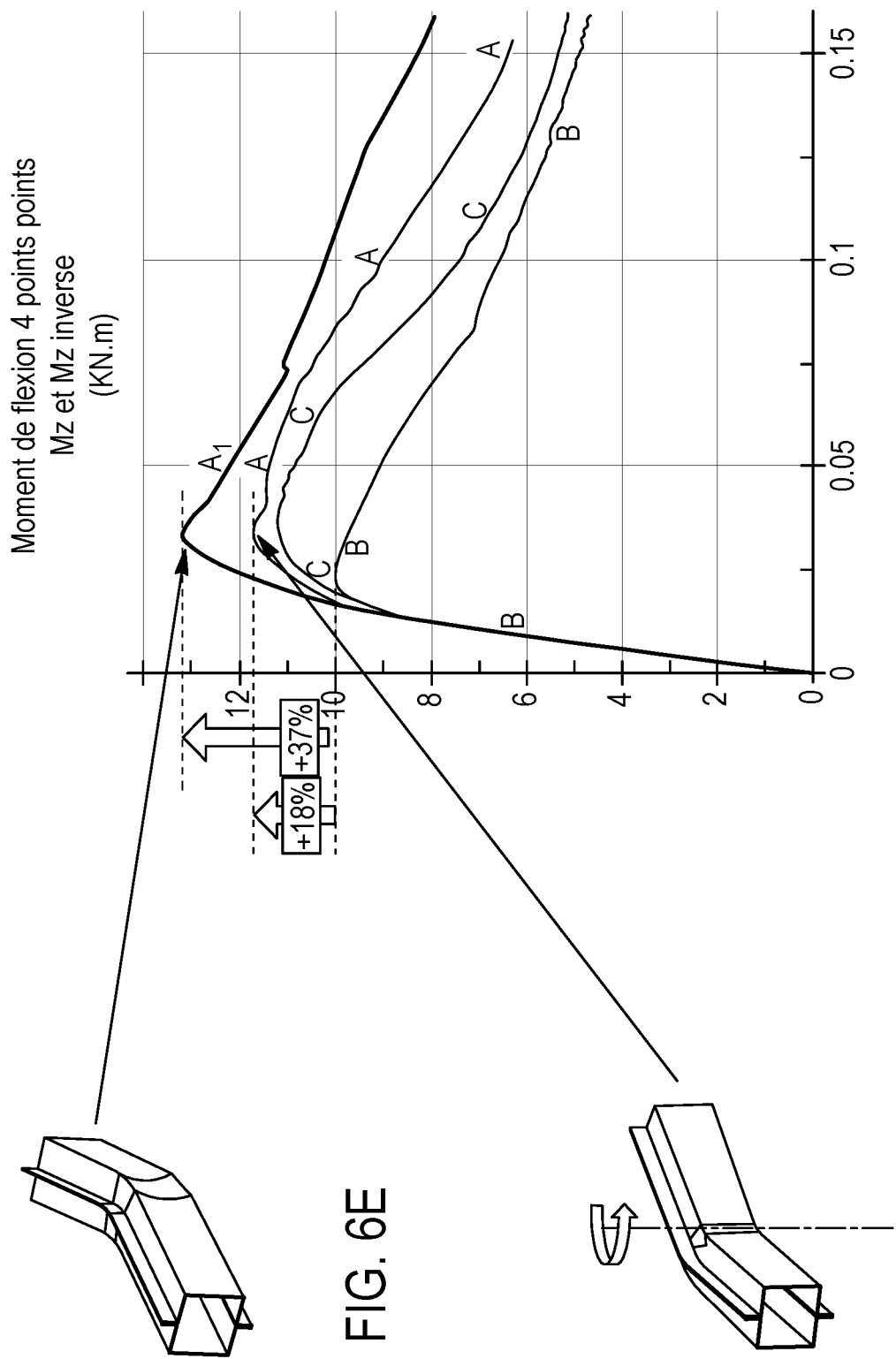

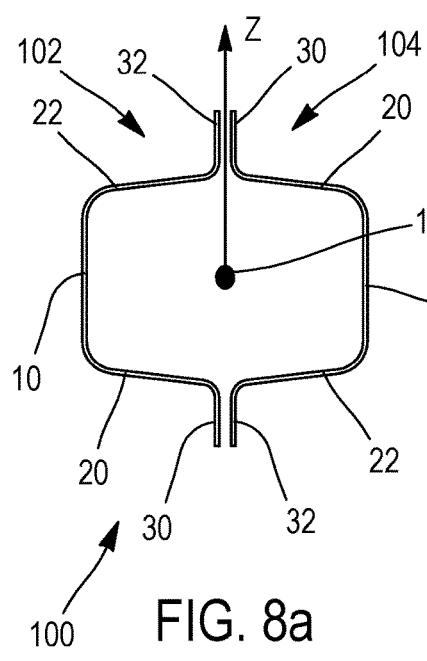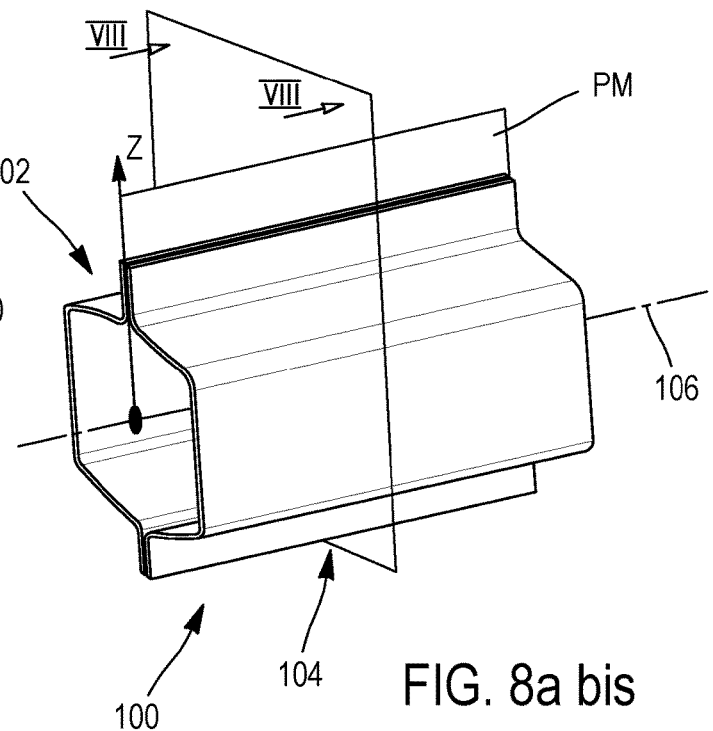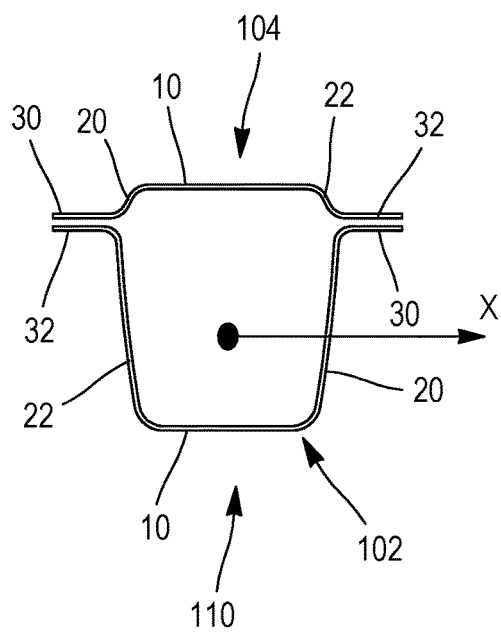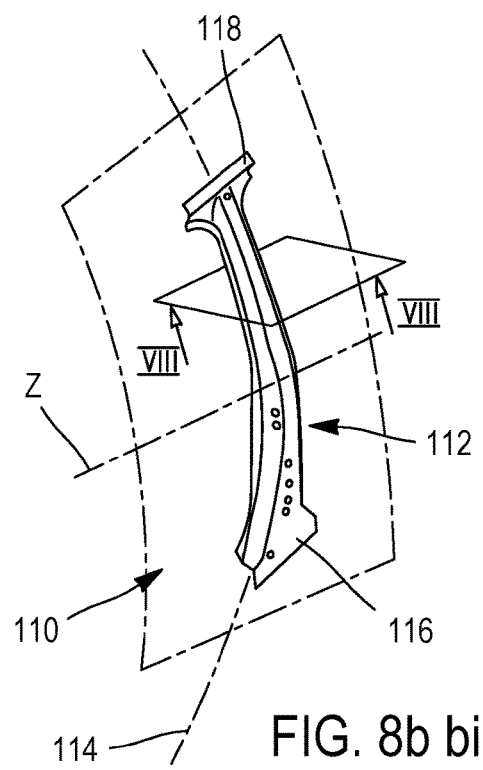
FIG. 8a
FIG. 8a bis
FIG. 8b
FIG. 8b bis

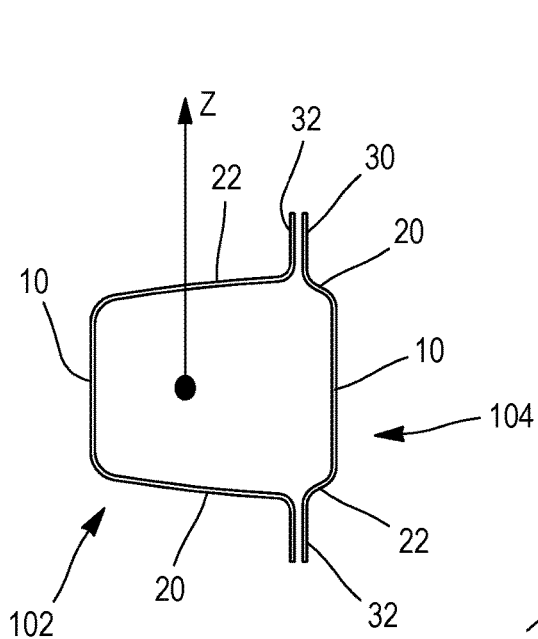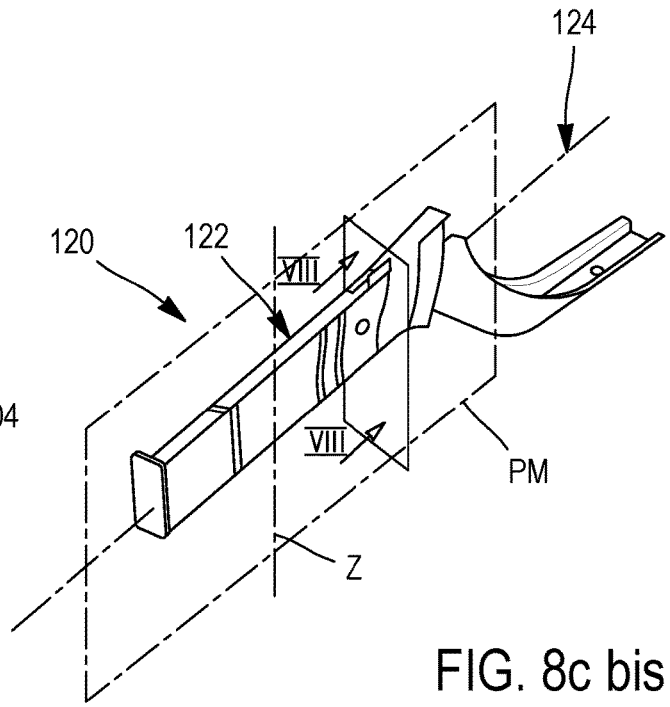
FIG. 8c
FIG. 8c bis
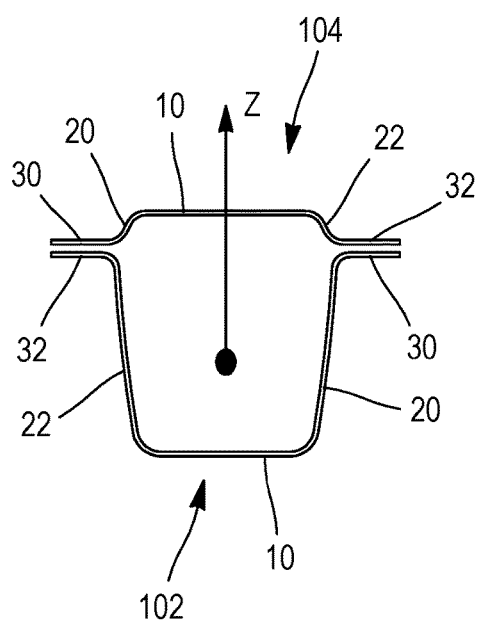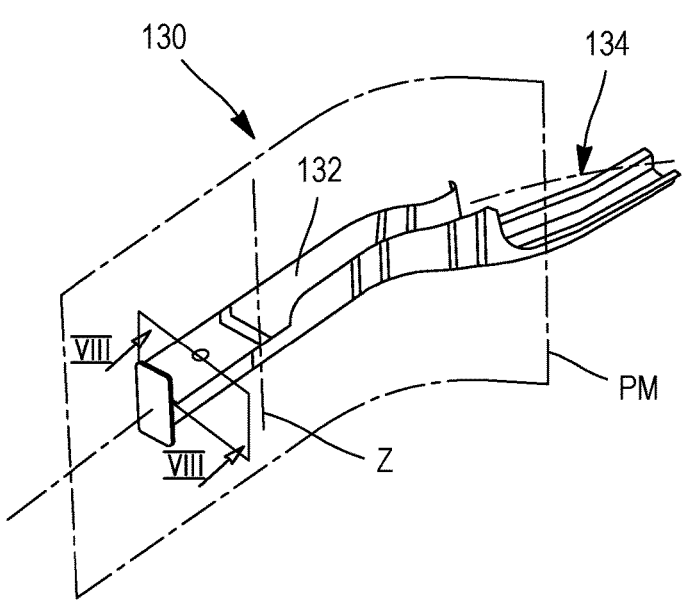
FIG. 8d
FIG. 8d bis

METAL PART WITH CONTROLLED DEFORMATION ORIENTATION

FIELD OF THE INVENTION

This invention relates to the field of metal pieces that form a piece of the manufacture of a metal framework, notably of a chassis or bodywork or body of vehicles.

STATE OF THE ART

Examples of manufacturing known pieces can be found in the documents WO2006/038868, WO2009/123538, EP2143621, EP2565489, US2009/072586, JP2011/173166, JP07/119892, US2007/052258, GB2344794, WO00/03909, DE10257262 and DE102006048429.

GENERAL OBJECTIVE OF THE INVENTION

The aim of the present invention is to propose means that enable the accurate control of the nature and orientation of the deformation of a metal piece, preferably elongated and/or compact.

The above-mentioned goal is achieved according to the invention due to a metal piece having at least two mechanical resistance areas below the body of the piece, arranged respectively on one side and the other of a longitudinal center section on the said piece, alternatively in places longitudinally separated along the length of the piece.

According to another aspect of the invention, the metal piece comprises a bottom to the piece and two side flanges separated from the bottom of the piece by walls, the section of the metal piece being duly defined by two reference axes, one being substantially orthogonal to the bottom of the piece and the other entirely parallel to at least one flange, and the piece comprises an area of lower mechanical strength established at the time of stamping and that runs along at least one of the walls, asymmetrically with respect to the reference axes.

According to another aspect of the invention, the metal piece comprises a bottom to the piece and two side flanges separated from the bottom of the piece by walls, and the piece comprises an area of lower mechanical strength established at the time of stamping that has a varying width perpendicularly to a cross-section plane of the piece.

Figure 2B:
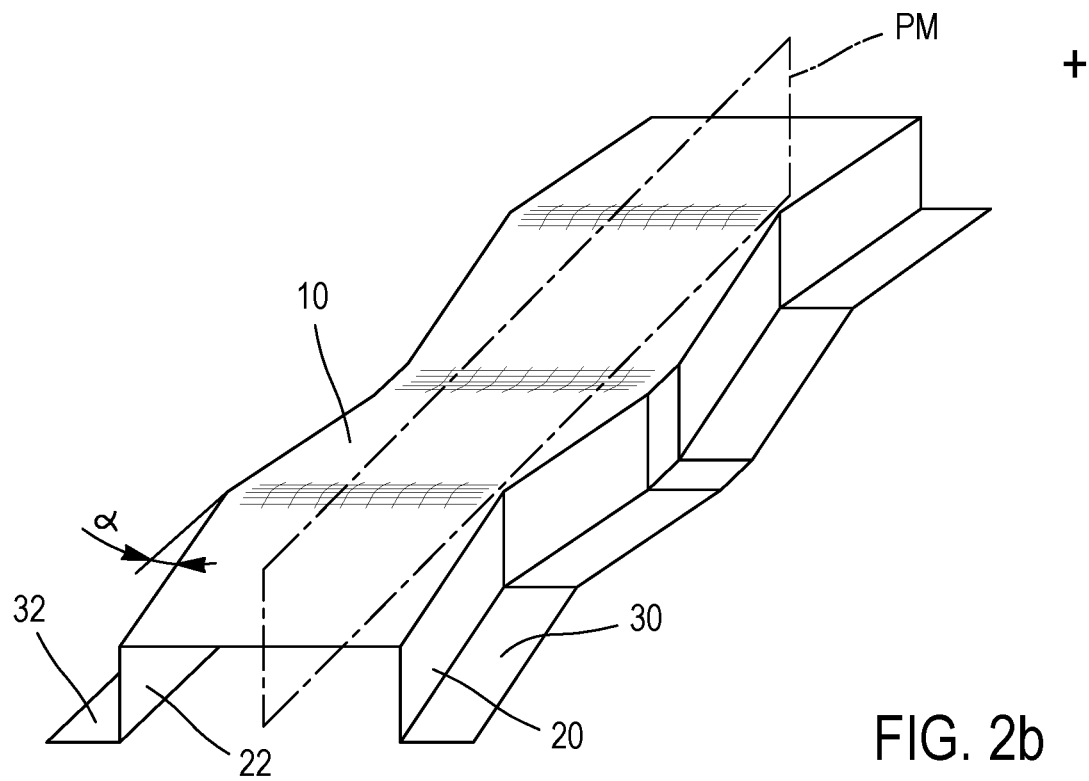
Figure 2F:
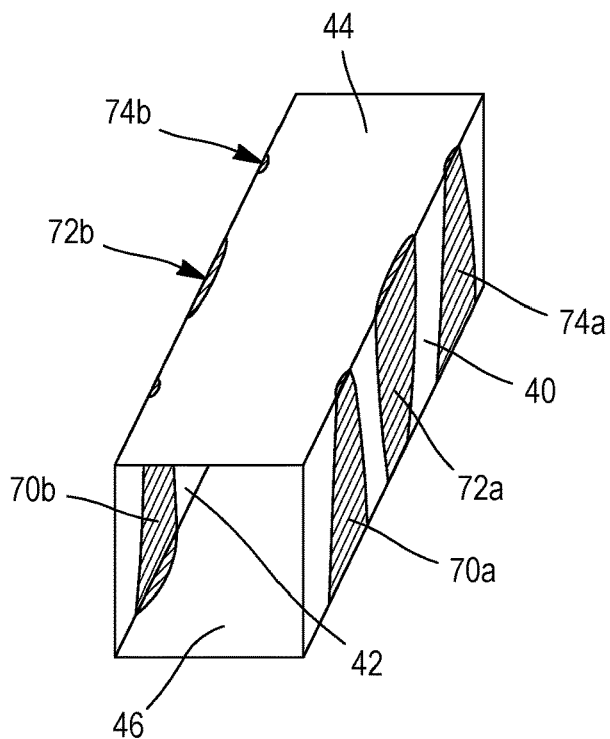
Figure 2G:
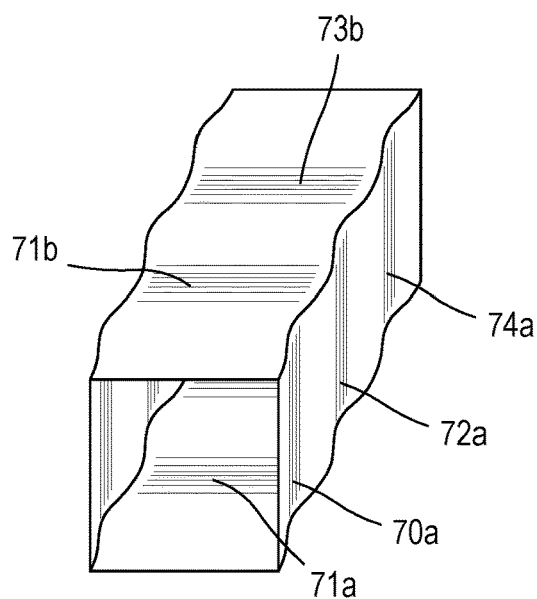
Figure 2H:
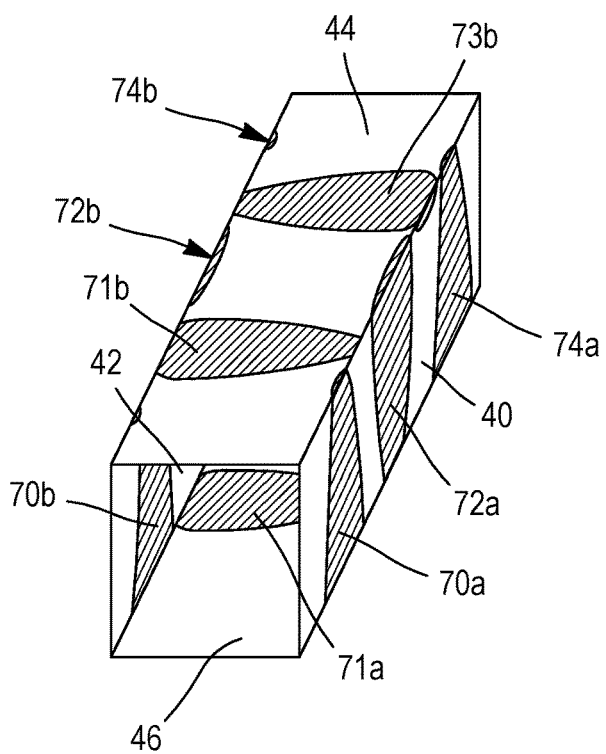
Figure 2I:
Figure 2J:
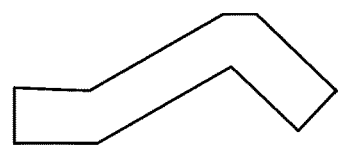
Figure 2K:
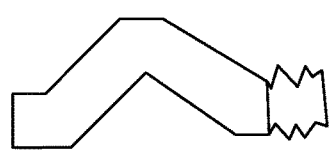
Figure 3A:
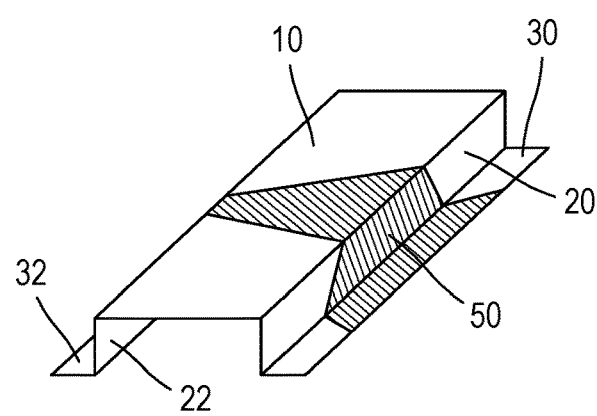
Figure 3B:
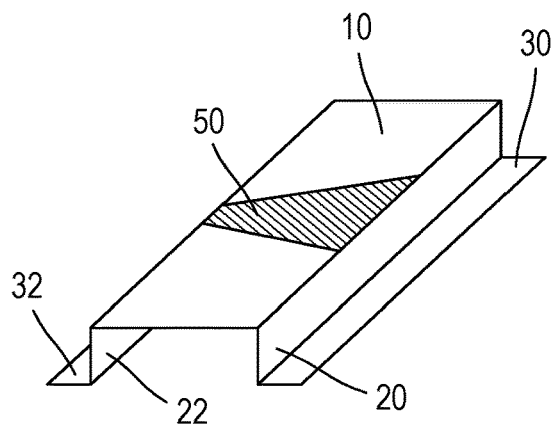
Figure 3C:
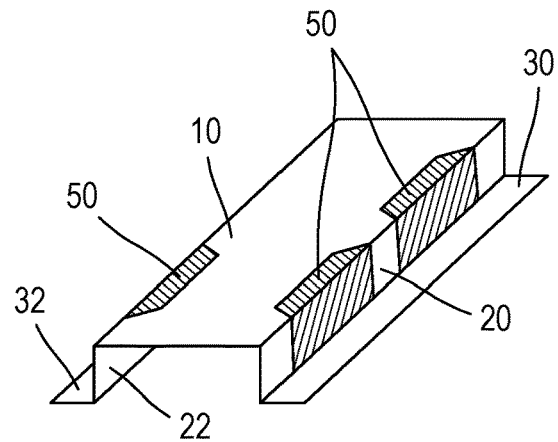
Figure 3D:
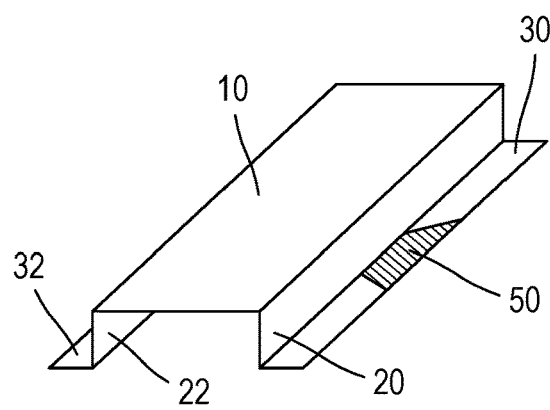
Figure 3E:
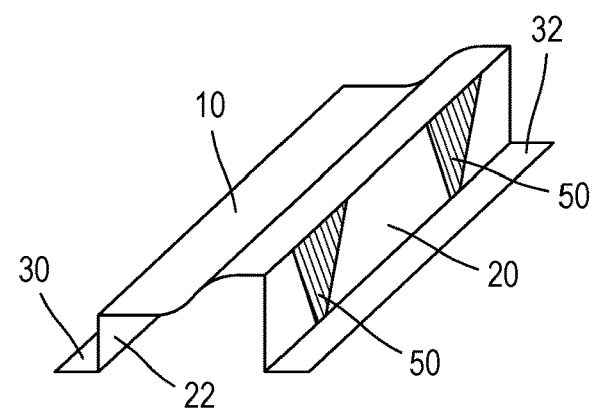
Figure 3F:
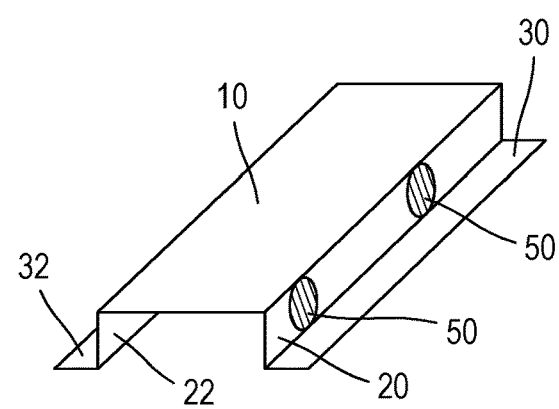
Figure 4:
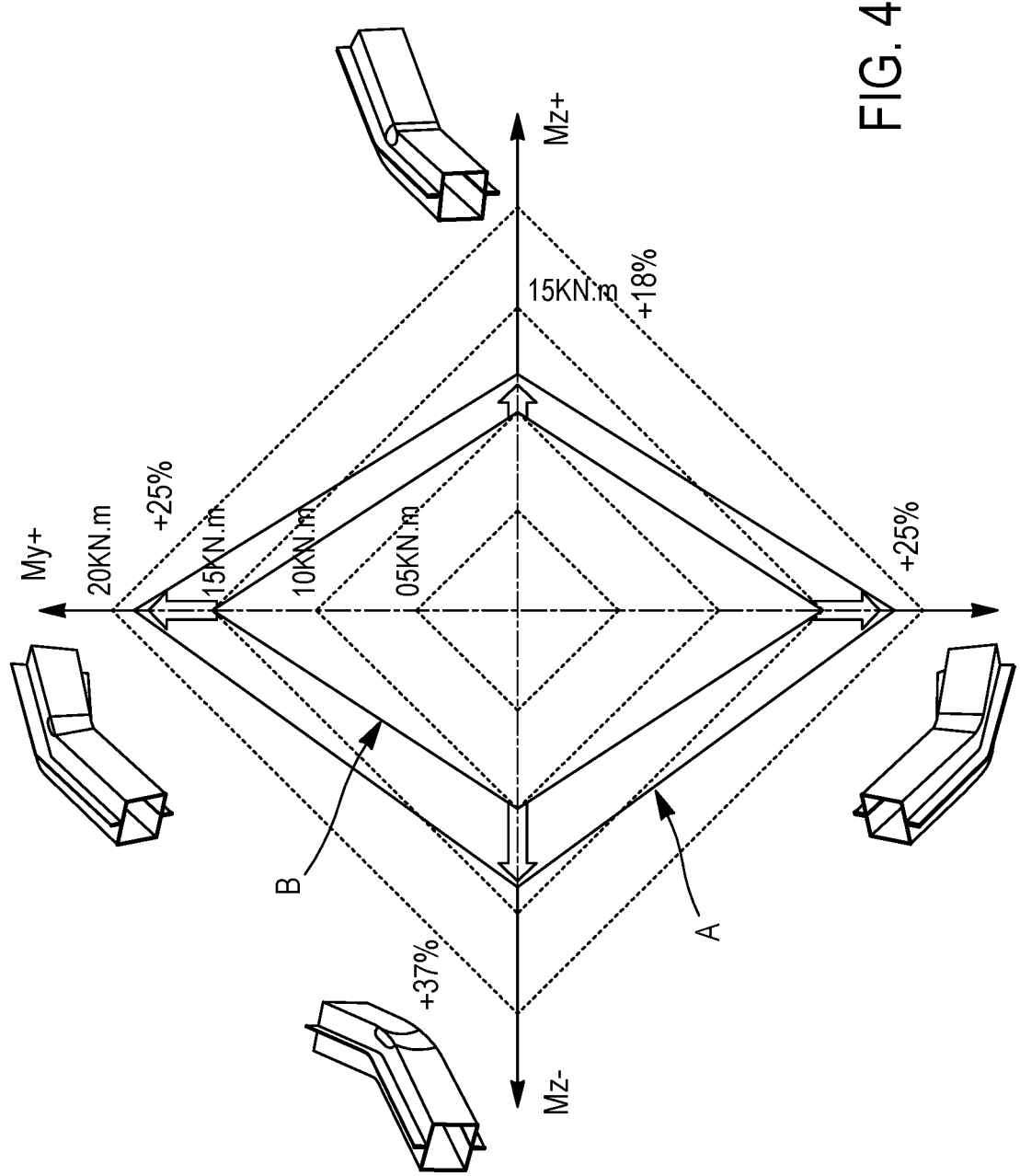
Figure 9:
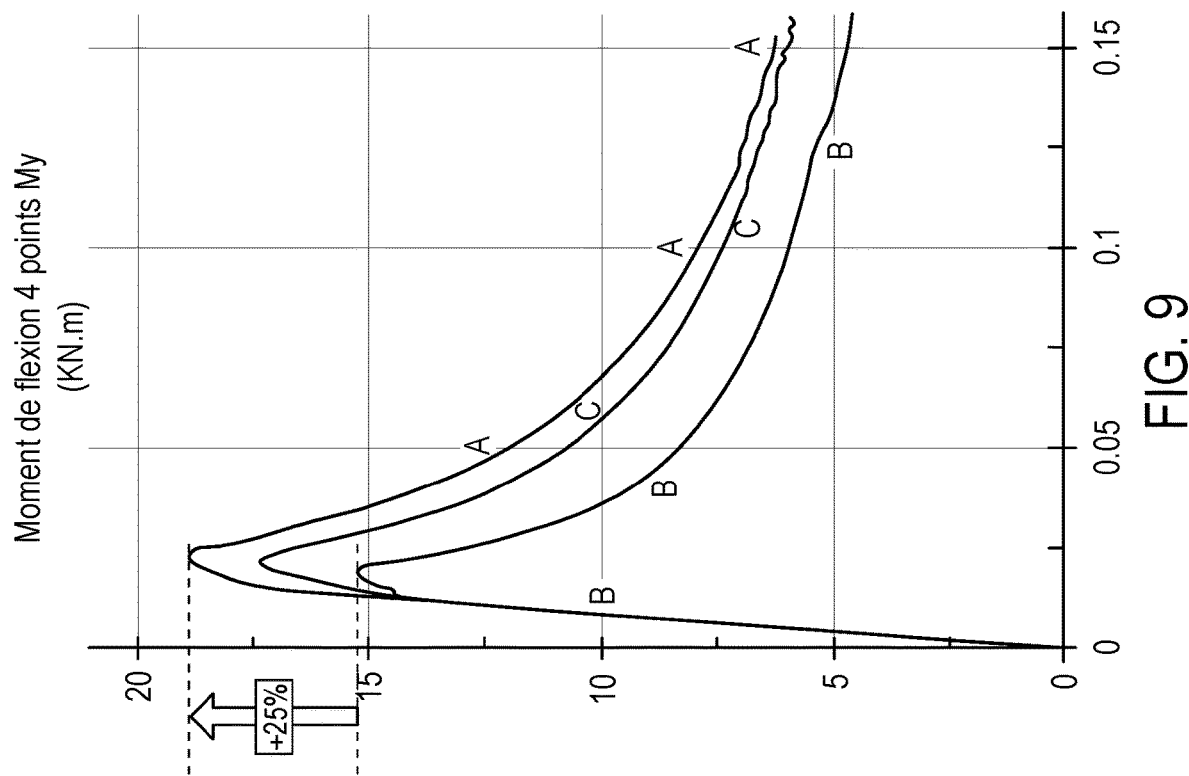
Figure 7D:
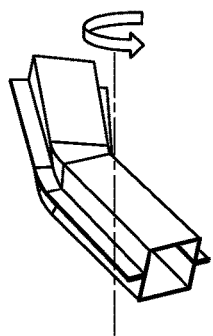
Figure 6D:
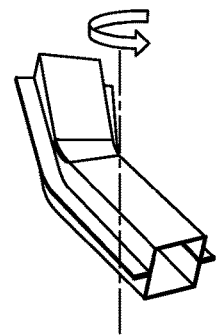

Regarding other characteristics, the purposes and advantages of the present invention will emerge upon reading the following detailed description and upon viewing the attached designs and drawings given as non-limitative examples and regarding which:

FIGS. 1a, 1b, 1c, and 1d are drawings of the cross-sections of four general variants of the manufacture of the pieces to which the invention may be applied, FIGS. 2a to 2k represent different examples of manufacture of metal pieces in accordance with the present invention comprising at least two areas of lower mechanical strength than the body of the piece, arranged respectively on one side and the other of a central longitudinal section of said piece, FIGS. 3a to 3f represent six non-limitative examples of pieces in accordance with variants of the present invention comprising reduced mechanical strength and a varying length, FIG. 4 represents a comparative diagram of the bending moments obtained according to 4 bending axes, respectively for a piece in accordance with the invention represented in FIG. 6A having an area of lower mechanical strength limited to a portion of its cross-section and for a classic example represented by FIG. 7A, having an area of lower mechanical strength on the entirety of its cross-section, FIG. 5 represents the bending moments curve over time, around axis Z, respectively for the piece in accordance with the invention represented in FIG. 6A, and for the classic example represented by FIG. 7A, and for an alternative variant of the piece in accordance with the invention represented in FIG. 6Abis, FIGS. 6B, 6Bbis and 7B represent cross-section views of the same pieces and display the placement of the areas of lower mechanical strength, whereas FIGS. 6C, 6Cbis and 7C represent the bending of pieces around axis Z corresponding to the curves illustrated in FIG. 5, FIGS. 8a, 8b, 8c and 8d represent four non-limitative variants of the section of pieces in accordance with the present invention and displays preferred flexural axes for these pieces, whereas FIGS. 8abis, 8bbis, 8cbis and 8dbis show a central longitudinal section for these pieces, FIG. 9 represents the bending moments curve over time, around axis Y, respectively for the piece in accordance with the invention represented in FIG. 6A, and for the classic example represented by FIG. 7A, and for an alternative variant of the piece in accordance with the invention represented in FIG. 6Abis, the FIGS. 6D and 7D represent the flexures of the piece in accordance with the invention represented in FIG. 6A and for the classic example represented by FIG. 7A around axis Y corresponding to the curves illustrated in FIG. 9, Ia FIG. 10 represents the bending moments curve over time, respectively for the piece in accordance with the invention represented in FIG. 6A, for the classic example represented by FIG. 7A and for the alternative variant of the piece in accordance with the invention represented in FIG. 6Abis, around axis Z and this respectively in the desired bending direction and in the opposite direction, FIGS. 6C1, identical to FIGS. 6C, and 6E represent the bending moments of the piece in accordance with the invention represented in FIG. 6A around axis Z and this respectively in the desired bending direction and in the opposite direction.

We shall now describe 4 examples of those pieces in which the present invention can be applied, with regard to FIGS. 1a to 1d. These figures represent the straight section, or "cross-section", of four alternative embodiments, along a plane perpendicular to a main longitudinal axis for the pieces. This main longitudinal axis for the pieces will be similarly named "main axis of extension" hereinafter. In this way, the illustrated pieces preferably have a constant straight section along their entire length that corresponds to the representation given in FIGS. 1a to 1d. According to an alternative however, the cross-section of the pieces may be developed lengthwise along the pieces.

We have shown in the FIGS. 1a, 1b and 1c, attached herein, different exemplary embodiments of the metal pieces comprising a bottom 10 to the piece and two side flanges 30, 32, separated from the bottom 10 of the piece by walls 20, 22.

According to the embodiment in FIG. 1a, the piece, generally hat-shaped, comprises a U-shaped body 12 comprising a core that forms the bottom 10 of the piece and two flanges entirely orthogonal to the bottom 10 and forming the walls 20, 22. The side grooves 30, 32, extending entirely orthogonally to the walls 20, 22 and therefore entirely parallel to the bottom 10 of the piece according to FIG. 1a.

According to FIG. 1b, the body is generally L-shaped comprising a core that forms the bottom 10 of the piece, a flange substantially orthogonal to the bottom 10 and forming a wall 20, a first flange 30 that extends substantially orthogonally to the wall 20 and therefore substantially parallel to the bottom 10 of the piece, a second flange 22 that extends parallel to the bottom 10 of the piece and forms a second wall 22, and a flange 32 which stretches out entirely in the projection of the core 22.

According to FIG. 1c, the body is formed by a substantially flat sheet in such a way that the two walls 20, 22 are substantially located within the projection of the core forming the bottom 10 of the piece and the two flanges 30, 32 are similarly substantially within the projection of the walls 20, 22.

According to the three embodiments represented in the FIGS. 1a, 1b and 1c, the two flanges 30, 32 are parallel to each other. However, this arrangement is by no means limiting. Variants in which the two flanges 30, 32 are at least slightly inclined with respect to the other can be envisaged.

As can be seen in the FIGS. 1a, 1b and 1c, in each one of the alternative embodiments, the metal piece has a cross-section defined by two reference axes, one A-A substantially orthogonal to the bottom 10 of the piece and the other B-B substantially parallel to at least one flange.

Moreover, an alternative embodiment is represented in FIG. 1d. According to this embodiment, the piece is a tubular piece comprising, but not limited to, a section defined by four substantially flat walls 40, 42, 44 and 46, respectively parallel and orthogonal in pairs.

Again, the piece outlined in FIG. 1d comprises two reference axes, one A-A substantially orthogonal to the walls 40, 42 and parallel to the walls 44, 46 and the other B-B wholly parallel to the walls 40, 42 and orthogonal to the walls 44 and 46.

FIGS. 2a through 2k represent different exemplary embodiments of metal pieces in accordance with the present invention comprising at least two areas of lower mechanical strength than the body of the piece, arranged respectively on both side of central longitudinal section PM of the aforementioned piece passing through the reference axis A-A.

The invention applies to elongated pieces having a main elongation axis or "main extension axis".

The cross-sections of the pieces are cross-sections in planes perpendicular to this elongation axis or main axis along which the piece extends.

In the context of this present application, it is understood that "central longitudinal cross-section" refers to a longitudinal cross-section that passes through centers of inertia or gravity of two cross-sections in the piece located close to the ends of a portion, the longitudinal cross-section extending in accordance with the main elongation axis.

More precisely, the "central longitudinal cross-section" is a longitudinal section of a piece that passes through the main axis along which the piece extends, this axis itself passing through centers of inertia of the cross-section of the piece (single piece made from materials or to be assembled from several elementary pieces) perpendicular to the slenderness axis and through a preferred bending axis chosen following the deformation pattern.

By way of non-limiting examples, the preferred bending axis will be a vertical axis Z in a benchmark vehicle for a side rail and a horizontal axis X for a center pillar.

The central longitudinal section of a piece is not necessarily flat. It could be curved.

In cases involving a straight-lined piece of constant cross-sections, the central longitudinal cross-section is however flat. This flat longitudinal central plane section can pass through, for example, half of the width or the thickness of a piece.

In cases where a "piece" in accordance with the invention is formed by the assembly of several initially individual bodies, yet joined together through assembly, the central longitudinal cross-section is a longitudinal cross-section that passes through centers of inertia or gravity of two straight transverse cross-sections of the assembly of said elements.

In FIG. 8a we have shown the cross-section of a beam 100 formed by the assembly of two hat-shaped pieces 102, 104 of the type illustrated in FIG. 1a, coupled together and assembled at the level of their flanges 30, 32. The beam 100 extends according to a longitudinal elongation or slenderness axis 106 that corresponds, for example, to an axis Y in a benchmark vehicle. Likewise, in FIG. 8a we have shown the chosen preferred bending axis Z. Under these circumstances, and arbitrarily, the preferred bending axis Z extends within the plane of the cross-section and within a joint plane between the two pieces 102, 104. We have likewise represented in FIG. 8abis a flat longitudinal central plane section PM of a piece that passes through the slenderness axis 106 and through the bending axis Z. The flat central longitudinal section PM passes through centers of inertia or gravity of the two cross-section sections of the piece located close to the ends of the beam 100. The central longitudinal section PM illustrated in FIG. 8abis is merely an example of the central longitudinal section of the beam illustrated, defined by the chosen preferred bending axis Z. The beam illustrated in FIG. 8a does indeed present unlimited central longitudinal sections passing through said centers of inertia or gravity, according the chosen preferred bending axis.

In FIGS. 8b and 8bbis we have shown a piece 110 forming a center pillar comprising a main portion 112 that extends according to a curved elongation or slenderness axis 114 and that has a baseplate 116 and a dissymmetric head 118. The elongation or slenderness axis 114 extends substantially according to a vertical axis Z in the benchmark vehicle. As has been shown in FIG. 8b, the piece 110 forming a center pillar is again formed by the assembly of two hat-shaped pieces 102, 104 of the type illustrated in FIG. 1a, coupled and assembled at the level of their flanges 30, 32 (in this case, the piece 104 is a covering piece with walls 20, 22 lower in height than those of the walls 20, 22 of the main piece 102). Here the walls 20, 22 and the bottoms 10 of the piece thus extend vertically. Likewise, in FIG. 8b we have shown a chosen preferred bending axis X (here horizontal in a benchmark vehicle). In this case, and arbitrarily, the preferred bending axis X extends within the plane of the cross-section and perpendicularly to the walls 20, 22 of the main piece 102. Likewise, in FIG. 8bbis we have shown a flat central longitudinal section PM of a piece that passes through the slenderness axis 114 and through the bending axis X. The flat central longitudinal section PM passes through centers of inertia or gravity of the two straight transverse sections of the piece located close to the ends of the beam or the central section of the piece 110 extending in accordance with the main elongation axis 114. The central longitudinal section PM illustrated in FIG. 8bbis follows the contour of the curved elongation axis 114, and is curved in accordance with the curvature thereof. The central longitudinal section PM illustrated in FIG. 8bbis is merely an example of the central longitudinal section of the beam illustrated, defined by the chosen preferred bending axis X. The beam illustrated in FIG. 8a does indeed present an unlimited number of central longitudinal sections passing through said centers of inertia or gravity, according the chosen preferred bending axis.

In FIGS. 8c and 8cbis, we have shown a piece 120 forming side-rails comprising a straight-lined main portion 122 that extend according to an elongation axis or axis of extension 124. The elongation axis or axis of extension 124 extends substantially according to a horizontal axis Y in a benchmark vehicle. As shown in FIG. 8c, the piece 120 forming side-rails is also formed by the assembly of two hat-shaped pieces 102, 104 of the type shown in FIG. 1a, coupled and assembled at the level of their flanges 30, 32 (the piece 104 is a covering piece or inner coating with walls 20, 22 variant alternative). Here, the walls 20, 22 thus extend horizontally, whereas the bottoms 10 of the piece extend vertically. Likewise, in FIG. 8c we have shown a chosen preferred bending axis Z (herein vertical in a benchmark vehicle). In this case, and arbitrarily, the preferred bending axis Z extends in the plane of the cross-section and perpendicularly to the walls 20, 22 of the main piece 102. Likewise, in FIG. 8cbis we have shown a flat central longitudinal section PM of a piece that passes through the slenderness axis 124 and through the bending axis Z. The flat central longitudinal section PM passes through the centers of inertia or gravity of the two straight transverse cross-sections of the piece located close to the ends of the main section of the piece 120 extending according to the main elongation axis 124. The central longitudinal cross-section PM illustrated in FIG. 8cbis is flat. The central longitudinal cross-section PM illustrated in FIG. 8cbis is merely an example of the central longitudinal cross-section of the beam illustrated, defined by the chosen preferred bending axis Z. The beam illustrated in FIG. 8c does indeed have unlimited central longitudinal cross-sections passing through said centers of inertia or gravity, according to the chosen preferred bending axis.

In the FIGS. 8d and 8dbis, we represented a variant of piece 130 forming a side-rail comprising a main curved longitudinal portion 132 that extends according to a curved elongation or slenderness axis 134. The elongation or slenderness axis 134 extends substantially according to a horizontal axis Y in a benchmark vehicle. As has been represented in FIG. 8d the piece 130 forming a side-rail is again formed by the assembly of two hat-shaped pieces 102, 104 of the type illustrated in FIG. 1a, coupled and assembled at the level of their flanges 30, 32 (in this case, the piece 104 is a covering or coating piece with walls 20, 22 lower in height than those of the walls 20, 22 of the main piece 102). The cross-section represented in FIG. 8d is geometrically identical to that of FIG. 8c, though swiveled 90° with respect to FIG. 8c. Here, the walls 20, 22 thus extend vertically, whereas the bottoms 10 of the piece extend horizontally. Likewise, in FIG. 8d we have shown a chosen preferred bending axis Z (herein vertical in a benchmarker vehicle). In this case, and arbitrarily, the preferred bending axis Z extends in the plane of the cross-section and perpendicularly to the bottom 10 of the piece of the main piece 102. Likewise, in FIG. 8dbis we have shown a flat central longitudinal section PM of a piece that passes through the slenderness axis 134 and through the bending axis Z. The flat central longitudinal section PM passes through the centers of inertia or gravity of the two cross-sections of the piece located close to the ends of main portion of the piece 130, extending according to the main elongation axis 134. The central longitudinal section PM illustrated in FIG. 8dbis follows the contour of the curved elongation axis 134, and is curved in accordance with the curvature thereof. The central longitudinal section PM illustrated in FIG. 8dbis is merely an example of the central longitudinal section of the beam illustrated defined by the chosen bending axis Z. The beam illustrated in FIG. 8d does indeed have unlimited central longitudinal sections passing through the aforementioned centers of inertia or gravity, according to the chosen preferred bending axis.

The sectional drawing of the cross-sections shown in FIGS. 8a, 8b, 8c and 8d (sectional drawings perpendicular to the main longitudinal axis of the pieces) are referenced VIII-VIII in FIGS. 8abis, 8bbis, 8cbis and 8dbis.

As previously mentioned, the chosen bending axes depend on the desired deformation. These are not limited to the models described above. Specifically, the bending axes are not necessarily perpendicular or parallel to the walls 20, 22 of the pieces, but may extend according to any angle with respect to said walls 20, 22, for example to 45° or another angle in relation to these walls.

Following the description, by way of simplification, we shall use the expression "longitudinal central plane", which is by no means limiting. The expression "longitudinal central plane" will indeed be considered to encompass all of instances of "central longitudinal section", even when this is not flat, thus conforming to the preceding definition.

In the context of this present application, "two areas respectively arranged on one side and the other", is to be understood as meaning two areas that extend respectively on one side and the other of longitudinal central plane of the piece, without one or the other of the two areas covering said longitudinal central plane.

More precisely, we can see in FIG. 2a an embodiment of a piece of the type illustrated in FIG. 1a that comprises three areas 60, 62, 64 respectively and alternatively arranged on one side and the other of longitudinal central plane PM of said piece, passing through the reference axis A-A, yet similarly and alternatively located in locations separated longitudinally along the length of the piece.

In the context of this present application, it is understood that "areas alternatively located in locations separated longitudinally along the length of the piece" refers to areas that are located in the different locations in the piece, distributed longitudinally along the length of the piece, without said areas being adjoining.

According to the embodiment shown in FIG. 2a, areas 60, 62 and 64 are essentially defined on the walls 20, 22 of the piece. When appropriate, the areas 60, 62 and 64 may be similarly extended at least in part on the transition areas between the walls 20, 22 and the bottom 10 of the piece and/or the flanges 30, 32, likewise in part on the bottom 10 of the piece and/or the flanges 30, 32.

A person skilled in the art will understand that such a piece enables the definition of points of weakness at the level of areas 60, 62 and 64. These areas of weakness 60, 62 and 64 create, when subjected to an axial load or lateral or transversal load on the PM plan is applied to the piece, of preferred articulation areas determining a direction of deformation. This leads to a concertina folding of the piece, as illustrated in FIG. 2b, forming two portions slanted with respect to the central plane PM of the piece in alternating directions. In FIG. 2b, we have shown the deformation of an angle α for certain portions of the piece, with respect to their original longitudinal plane. In this way, the piece as a whole maintains a general direction centered on the central plane PM.

In a more general sense, a person skilled in the art will understand that arrangements in accordance with the present invention enables a controlled deformation under compression and/or bending to be obtained, in other words, a deformation under only compression or deformation under only bending or a deformation under a combination of compression and bending, following the performance levels researched.

We can see in FIG. 2c an embodiment of a piece of the type illustrated in FIG. 1a that constitutes a variant of FIG. 2a and contains areas 60, 62, 64 respectively arranged on one side and the other of a longitudinal central plane PM of said piece which passes through the reference axis A-A, similarly and alternatively located alternatively in locations separated longitudinally along the length of the piece and having a varying length transversally to a plane of the cross-section of the piece.

In the context of this present application, it is understood that "section" or "cross-section", refer to a section of the piece passing through a plane perpendicular to the longitudinal or main axis of the piece.

The varying width of areas 60, 62, 64, enables the concertina deformation of the piece according to the reference axis A-A, as shown in FIG. 2b, to be improved despite the asymmetry of the structure of the piece.

In FIG. 2d, we have shown a variant applied to a tubular piece of the type illustrated in FIG. 1d for those alternating lower strength areas 70, 72, 74, respectively located on one side and the other of a longitudinal central plane and in locations separated longitudinally, are limited to two opposite walls 40, 42, and in FIG. 2i the resulting deformation.

It may be seen that these lower strength area 70, 72 and 74 are again formed in locations separated longitudinally along the length of the piece. This arrangement enables, as shown in FIG. 2i, concertina folding of the piece through the articulation around hinged areas created by the lower strength areas 70, 72 and 74.

A variant is illustrated in FIG. 2e. According to this variant, the areas of lower strength 70, 71, 72, 73, 74 are alternatively carried out on each of the walls 40, 42 and 44, 46. And therefore, the lower strength areas 70, 71, 72, 73, 74 are formed in locations successively separated longitudinally along the length of the piece. The areas of lower strength 70, 72, 74 formed in the opposite walls 40, 42, are staggered by half with respect to the lower strength areas 71, 73 formed in the walls 44 and 46 to which they are perpendicular. The areas 70, 72 and 74 are respectively located on one side and the other of a longitudinal central plane that passes through the axis A-A. In addition, the areas 71 and 73 are respectively located on one side and the other of a longitudinal central plane that passes through the axis B-B.

In FIG. 2f, we have shown a variant applied to a tubular piece of the type illustrated in FIG. 1d for which alternate lower strength areas 70, 72, 74, respectively arranged on both sides of a longitudinal central plane, are limited to two opposing partitions 40, 42, and in FIG. 2g the resulting deformation. The areas 70, 72 and 74 are respectively located on both sides of a longitudinal central plane that passes through the axis A-A.

We note here that the piece comprises additional lower strength areas such that two lower strength areas 70a, 70b, respectively 72a, 72b are formed in relation to the identical locations, longitudinally along the length of the piece. As shown in FIG. 2g, this arrangement enables the piece to fold as a result of collapsing on itself such that the piece remains, at all points along its length, substantially centered on the longitudinal central plane PM passing through the reference axis A-A.

Another variant is illustrated in FIG. 2h. According to this variant, the areas of lower resistance, 70, 71, 72, 73, 74 are alternatively carried out on opposite pairs of four walls 40, 42 and 44, 46. And therefore, the lower strength areas 70a, 70b; 71a, 71b; 72a, 72b; 73a, 73b; 74a, 74b are formed in regard to identical locations longitudinally along the length of the piece, but areas of lower strength 70a, 70b; 72a, 72b; 74a, 74b formed on the walls 40, 42, are staggered by half with respect to the lower strength areas 71a, 71b; 73a, 73b formed in the walls 44 and 46. The areas 70, 72 and 74 are respectively located on one side and the other of a longitudinal central plane that passes through the axis A-A. Areas 71 and 73 are respectively located on one side and the other of a longitudinal central plane that passes through the axis B-B.

FIGS. 2i, 2j and 2k display three non-limiting examples of controlled deformations likely to be obtained as a result of the invention, with at least two hinged lower strength areas of the type illustrated in FIG. 2a, 2c or 2d. More precisely the FIGS. 2i, 2j and 2k display three non-limiting examples of controlled deformations likely to be obtained as a result of the invention, respectively for FIG. 2i with 3 or 4 hinged lower strength areas of the type illustrated in FIG. 2a, 2c or 2d, FIG. 2j with 2 hinged lower strength areas of the type illustrated in FIG. 2a, 2c or 2d and FIG. 2k with axial juxtaposition of 2 hinged lower strength areas of the type illustrated in FIG. 2a, 2c or 2d and one assembly designed to collapse on itself, which incorporates hinged lower strength areas of the type illustrated in FIG. 2f or 2h.

A person skilled in the art will understand that the embodiment shown in FIG. 2a corresponds to an embodiment according to which the metal piece in accordance with the present invention comprises at least one lower strength area of mechanical strength, defined during stamping and that extends to at least one of the walls, dissymmetrical with respect to the reference axes A-A and B-B, in this case at least with respect to the reference axis A-A.

The fact that two asymmetric lower mechanical strength areas have been provided with respect to the reference axes and, when appropriate, with a varying width as shown below, enables the orientation of the deformations created under stress to be finely controlled.

In the case where a piece has an asymmetric section with respect to the central plane PM, as shown for example in FIG. 3e, the use of a varying width for at least certain lower mechanical strength areas 50 enable, for example, a bending axis maintained in this central plane to be imposed, due to the structural dissymmetry of the piece, a weaker mechanical strength area would lead to an inclined bending axis with respect to the central plane.

Generally, in this lower mechanical strength area there will be an increasing width towards the sectors of the piece with a more complex straight structure and thus in theory have a greater mechanical strength.

The aforementioned arrangement of the varying width similarly allows for, should this be desired, a symmetrical piece with respect to the central plane or any reference axis, to impose a bending axis that is not orthogonal to this reference or inclined axis with respect to the central plane of reference, and thus impose the deformation direction of the piece.

In the FIGS. 3a to 3f, we have shown six exemplary embodiments of a piece of the type illustrated in FIG. 1a having areas 50 of lower mechanical strength than the rest of the body, formed during stamping of the piece and which has a varying width transversally with respect to the cross-section plane of the piece. This arrangement, namely the use of the lower mechanical strength having a varying width, which enables the deformation direction of the piece to be controlled whilst bending.

The areas of lower mechanical strength are shown in cross-hatching in FIGS. 3a to 3f.

A person skilled in the art will understand that these pieces contain areas of lower mechanical strength, which are dissymmetric with respect to the reference axes.

More accurately, according to FIG. 3a, the areas 50 are formed on all of the section of the piece and thus extend towards the bottom 10 of the piece, the walls 20, 22 and the grooves 30 and 32.

According to FIG. 3b, the areas 50 are formed on the bottom 10 of the piece.

According to FIG. 3c, the areas 50 are essentially formed on the walls 20, 22 and partly in the transitions between the walls 20, 30 and the bottom 10 of the piece.

According to FIG. 3d, the areas 50 are essentially formed on a flange 30.

Moreover, FIG. 3e shows another embodiment of a variant of piece inspired by the hat type illustrated in FIG. 1a, but in which the base body, or bottom 10 is not symmetrical with respect to the reference axis A-A. In this case, one of the walls 20 is larger than the other wall 22. The piece includes at least part of this wall 20, an area 50 of lower mechanical strength with which the rest of the body is formed during the stamping of the piece and this area 50 extends to the bottom 10 of the piece.

In addition, this piece comprises an area of lower mechanical strength, which is dissymmetric with respect to the reference axes.

According to the embodiments represented in the FIGS. 3a to 3e, the sides of the areas 50 of lower mechanical strength are substantially rectilinear and inclined inwards.

In FIG. 3f, we have shown another embodiment according to which the areas 50 of lower mechanical strength have non-rectilinear sides that are curved and have a general ovoid shape, for example on wall 20.

A person skilled in the art could come up with numerous other embodiment variants, notably in the areas of lower mechanical strength in the neighbouring transition areas of the crosshatched areas represented in the attached figures.

The areas of lower strength have variable widths according to the methods of production shown in the FIGS. 2c, 2d, 2e, 2f and 2h.

One can tell that according to the FIGS. 2c and 2d the width variations in areas of lower mechanical strength are identical along the entire length of the piece. However, according to embodiments shown in the FIGS. 2f and 2h, the width variations in said areas alternate, meaning they alternately increase and decrease in opposite directions to the section of the piece.

Preferably, the areas of lower mechanical strength are carried out by local control of the stamping temperature during a stamping process of the piece.

More precisely, the invention preferably implements a process comprising steps consisting of:
heating the piece to a temperature range suitable for obtaining an austenitic stage,
then stamping this piece in a stamping tool, comprising a least two complementary elements, respectively constituting the functions of punch and mould, among which the piece to be formed is stamped, adapted in order to define the different temperatures on different areas of the stamped piece with the aim of imposing different cooling methods on different areas on the piece.

Each of these punches and molds may be formed by the assembly of several juxtaposed blocks according to the geometry and dimensions of the piece in question.

The areas of the piece in contact with parts of the cooled stamping tool, are stamped at controlled temperatures leading to areas of higher mechanical strength, typically in excess of 1400 MPa, whereas the areas of the piece stamped at higher temperatures leads to areas of lower mechanical strength typically below 1100 MPa, for example comprised between 500 and 1000 MPa.

Lower mechanical strength in certain areas of the stamped piece may be obtained thanks to high local stamping temperatures, for example hollowing out areas in the stamping tool in such a way that the pre-heated piece can be cooled and/or have its stamping temperature locally increased, for example to help heating strength introduced locally in these stamping blocks.

Likewise, areas of the stamping blocks may be cooled, for example with the help of channels formed in these stamping blocks and in which cooling fluid circulates.

The present invention involves pieces made from steel.

It can be applied to all types of pieces implemented in an automobile vehicle, by means of non-limiting example, a center pillar or side-rail, or even in a shock absorber to absorb energy.

During compressed axial load, the areas of lower strength form hinged deformation areas that enable the direction of lateral deformation of the elongated piece to be oriented and thus avoids random deformation of the pieces.

The invention enables, for example, the deformation of side-rails to be oriented towards the outside of the passenger compartment and towards the inside thereof, thus minimising the risk of impact for the occupants of the passenger compartment.

The invention notably enables the absorption of energy to be optimised, should an accident occur.

It similarly enables the acceleration peaks felt by the occupants of a vehicle to be reduced, should an accident occur.

It is clearly understood that the present invention is not limited to embodiments that have been outlined herein, but rather extends to all variants corresponding to the same essence.

For example, the general U-shaped piece illustrated in FIG. 1a can be completed by a covering plate as illustrated in the FIGS. 8a, 8b, 8c and 8d.

Furthermore, the inclusion of assembled braced and/or stiffening ribs located on certain sides of the piece.

The term "metal piece", in the context of this invention, must be understood in its broadest sense to cover all unassembled single-block structures and to structures formed by the assembly of several initially individual bodies, later joined together during assembly.

We have illustrated in the FIGS. 6A, 6B and 7A, 7B pieces of geometrically identical cross-sections formed by two elementary h-shaped pieces C1 and C2 of the type illustrated in FIG. 1a, mounted head to tail and fixed in place by their flanges. The two pieces illustrated in the FIGS. 6A, 6B and 7A, 7B, respectively conforming to this invention, are distinguished by the fact that the piece illustrated in FIGS. 6A, 6B conforming to the present invention comprises an area of lower mechanical strength 50 limited to one of the bottoms 10 of the pieces of C2 and a part adjacent to the walls 20, 22, whereas the piece illustrated in the classic FIGS. 7A, 7B comprises an area of lower mechanical strength in the entirety of its cross-section.

We have illustrated in the FIGS. 6Abis and 6Bis a variant of the piece according to the present invention with the same geometry as FIGS. 6A and 6B (two elementary hat-shaped pieces C1 and C2 of the type illustrated in FIG. 1a, mounted head to tail and fixed in place by their flanges), yet comprising an area of lower mechanical strength 50 that covers all of one of the C2 two elementary pieces, or half of the complete piece formed by the assembly of two elementary pieces C1 and C2.

FIG. 5 represents the curve A of the bending moment around preferred axis Z of the piece according to the present invention according to FIG. 6A during bending around an axis parallel to the axis B-B (axe Z) as shown in FIG. 6C, the curve B of the bending moment around the same axis Z of the classic piece during bending around an axis parallel to the axis B-B as shown in FIG. 7C and the curve C of the bending moment around the same axis Z of the piece according to the present invention according to FIG. 6Abis during bending around an axis parallel to the axis B-B as shown in FIG. 6Cbis.

The examination comparing curves A and B shows that the invention enables higher bending moment (around +18% in this case) to be obtained.

FIG. 4 represents a comparative diagram of the bending moments obtained according to 4 bending axes, respectively for the piece in accordance with the invention represented in FIG. 6A containing an area of lower mechanical strength limited to part of the cross-section thereof and for the classic piece represented in FIG. 7A having an area of lower mechanical strength on the entirety of its cross-section.

More precisely, in FIG. 4 we have shown a diagram of the bending moments for 4 bending axes, Mz+ and Mz− corresponding to two flexion directions in opposite directions around an axis parallel to the axis B-B, whereas My+ and My− correspond to two flexion directions in opposite directions around an axis parallel to the axis A-A.

The examination of the FIG. 4 shows that the present invention allows for an identical section of the piece that can improve performance levels due to the increase in the range of the bending moment in the 4 bending axes and mainly in the 3 bending axes not devised for improving the overall robustness of the piece according to the desired/preferred bending axis (in other words, ensuring constant operational functionality during bending according to the desired/preferred bending axis to control the differences between moments according to the different axes), and this without causing risk of rupture.

FIG. 4 shows increase according to the invention of around +25° according to the bending axis Y, +37° as per the bending axis −Z, +25° as per the bending axis −Y and +18° as per to Z bending axis.

In FIGS. 9 and 10, we have shown curves that are based on the plots of the diagram represented in FIG. 4.

FIG. 9 represents the curve A of the bending moment around axis Y of the piece in accordance with the present invention according to FIG. 6A during bending around an axis parallel to the axis A-A (axis Y) as shown in FIG. 6D, the curve B of the bending moment around the same axis Y of the classic piece during bending around the same axis parallel to the axis B-B, as shown in FIG. 7D and the curve C of the bending moment around the same axis Y of the piece in accordance with the present invention according to FIG. 6Abis during bending around an axis parallel to the axis B-B.

The examination compared the A and B curves represented in FIG. 9 showing that the invention enables a higher moment (in the region of +25% in this case) to be obtained.

FIG. 10 contains the A, B and C curves illustrated in FIG. 5 for bending around axis Z as shown in FIG. 6C1 and represented moreover in curve A1 obtained due to bending according to the axis Z, of a piece in accordance to the invention according to FIG. 6A, but in the opposite direction to the one shown in FIG. 6E.

The comparison examination of the A, B and A1 curves represented in FIG. 10 show that the invention a higher moment (to the order of +18% in this case for bending according to Z as indicated above and +37% for bending according to −Z) to be obtained.

The invention claimed is:

1. A metal piece for a framework of a vehicle having a central longitudinal plane extending along a main bending axis and from a first end to a second end and having a high mechanical strength, the metal piece comprising:
   a plurality of areas of lower mechanical strength including
      a first area of lower mechanical strength being arranged at least partially on a first side wall of the metal piece, the first side wall being arranged on a first side of the central longitudinal plane, and wherein the first area of lower mechanical strength does not extend beyond the central longitudinal plane, and
      a second area of lower mechanical strength being arranged at least partially on a second side wall of the metal piece, the second side wall being arranged on a second side of the central longitudinal plane wherein the second side is opposite to the first side,
   the first area of lower mechanical strength longitudinally extending from a first longitudinal position to a second longitudinal position, and the second area of lower mechanical strength longitudinally extending from a third longitudinal position to a fourth longitudinal position,
   wherein the first and second longitudinal positions are closer to the first end than the third and fourth longitudinal positions,
   and wherein there is no further area of lower mechanical strength longitudinally arranged between the first and the second areas of lower mechanical strength.

2. The metal piece according to claim 1, wherein the second area of lower mechanical strength does not extend beyond the central longitudinal plane.

3. The metal piece according to claim 1, and further comprising a third area of lower mechanical strength being arranged at least partially on the first side wall of the metal piece and extending from a fifth longitudinal position to a sixth longitudinal position, the fifth and sixth longitudinal positions being closer to the second end than the third and fourth longitudinal positions.

4. The metal piece according to claim 3, wherein the first, second and third areas of lower mechanical strength are formed by local control of a stamping temperature during the stamping process of the metal piece.

5. The metal piece according to claim 1, wherein areas of high mechanical strength have a tensile strength of 1400 MPa or more.

6. The metal piece according to claim 5, wherein the first and second areas of lower mechanical strength have a tensile strength of 1100 MPa or less.

7. The metal piece according to claim 1, further having a substantially hat-shaped cross-section including the first side wall, the second side wall, a bottom wall connecting the first side wall with the second side wall, and a first flange extending outwardly from the first side wall and a second flange extending outwardly from the second side wall.

8. The metal piece according to claim 7, wherein the first area of lower mechanical strength extends into the first flange.

9. The metal piece according to claim 8, wherein the second area of lower mechanical strength extends into the second flange.

10. The metal piece according to claim 7, wherein the metal piece is a side-rail.

11. The metal piece according to claim 7, further comprising a cover plate attached to the first and the second flanges.

12. The metal piece according to claim 11, wherein the cover plate has a substantially hat-shaped cross-section.

13. A metal beam for a framework of a vehicle comprising:
a first metallic piece, and a second metallic piece, the first and the second metallic pieces being joined together to form a closed cross-section,
the metal beam having a longitudinal central plane extending along a vertical axis and a main bending axis, wherein the second metallic piece is vertically arranged on top of the first metallic piece and the metal beam comprising
at least two areas of lower mechanical strength, respectively being arranged on a first side wall on a first side of the longitudinal central plane and another side wall on an opposite side of the longitudinal central plane, and alternately located in locations separated longitudinally along a length of the metal beam,
wherein the areas of lower mechanical strength are not adjoined and each one of the areas is surrounded by an area of higher mechanical strength.

14. The metal beam according to claim 13, wherein the areas of lower mechanical strength are formed by local control of a stamping temperature during a stamping process of the metal beam.

15. The metal beam according to claim 13, wherein the area of higher mechanical strength has a mechanical strength above 1400 MPa, whereas the areas of lower mechanical strength have a mechanical strength lower than 1100 MPa.

16. The metal beam according to claim 13, wherein the at least two areas of lower mechanical strength are delimited by areas with rectilinear edges.

17. The metal beam according to claim 13, wherein the first metallic piece comprises a bottom and two side flanges separated from the bottom by the first and second sidewalls.

18. The metal beam according to claim 17, wherein the areas of lower mechanical strength extend into the two side flanges or into the bottom.

19. The metal beam according to claim 13, wherein the metal beam is a side-rail.

* * * * *